United States Patent

Higginbotham

[15] 3,653,676

[45] Apr. 4, 1972

[54] VEHICLE LEVELING SYSTEM

[72] Inventor: William W. Higginbotham, Monroe, Mich.

[73] Assignee: Monroe Auto Equipment Co., Monroe, Mich.

[22] Filed: Mar. 23, 1970

[21] Appl. No.: 21,714

Related U.S. Application Data

[62] Continuation of Ser. No. 722,506, Jan. 8, 1968, Pat. No. 3,539,744.

[52] U.S. Cl. ............................................. 280/6 P, 280/124 F
[51] Int. Cl. .................................................. B60g 17/04
[58] Field of Search ..................... 280/6, 6.1, 124 F; 200/82

[56] References Cited

UNITED STATES PATENTS 3,409,307  11/1968  Higginbotham ........................... 280/6
3,539,744  11/1970  Higginbotham ........................... 200/82

*Primary Examiner*—Philip Goodman
*Attorney*—Harness, Dickey & Pierce

[57] ABSTRACT

A leveling system for a vehicle comprising sprung and unsprung portions, a fluid operated leveling device for selectively varying the attitude between said vehicle portions, a source of actuating fluid, pump means for pumping fluid from said source thereof to said leveling device, a fluid accumulator including means defining first and second variable volume chambers at least in part defining therebetween a third chamber communicable with said fluid source and said leveling device, and means for controlling operation of said pump means in response to volume changes in at least one of said chambers.

23 Claims, 13 Drawing Figures

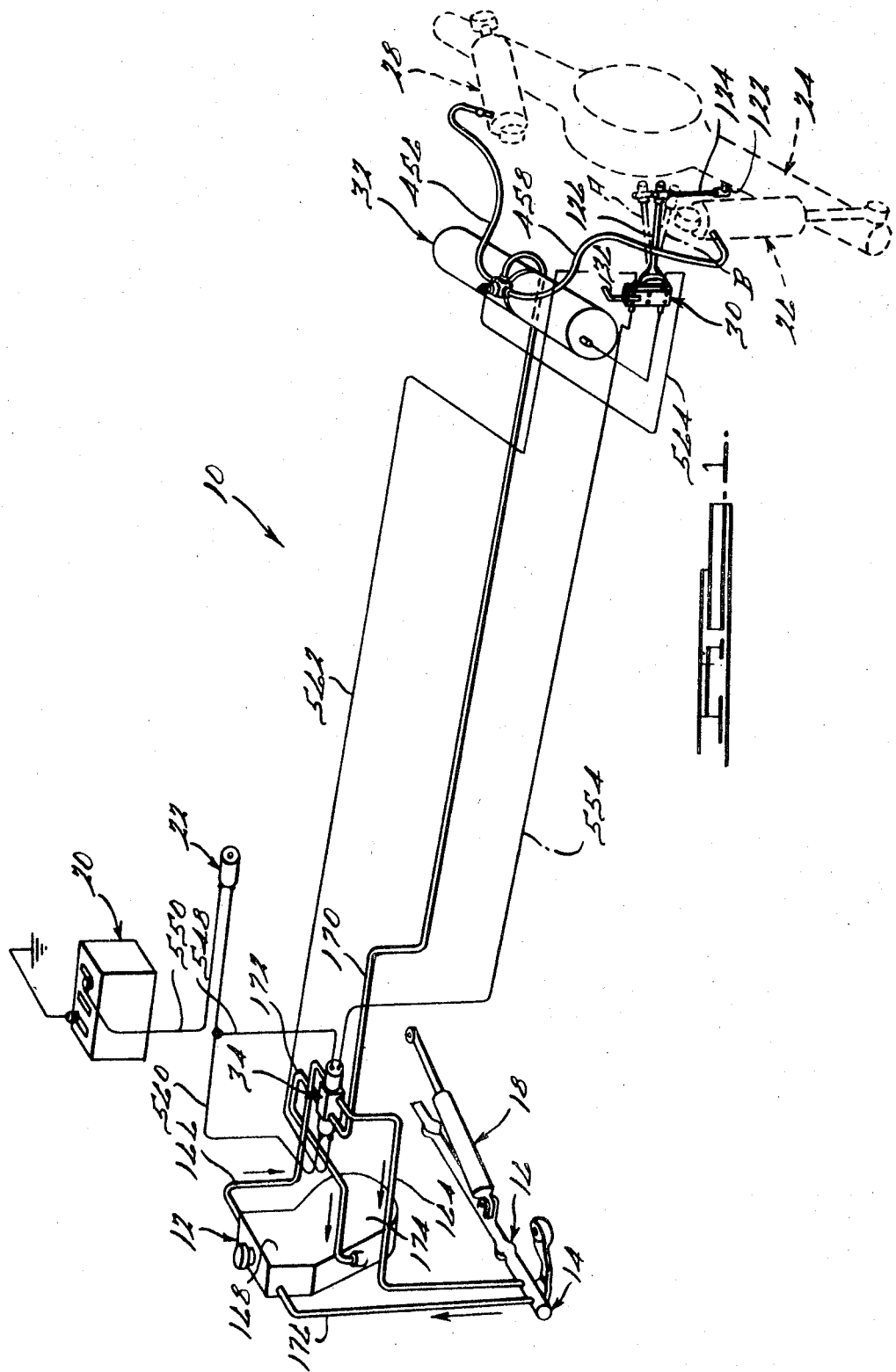

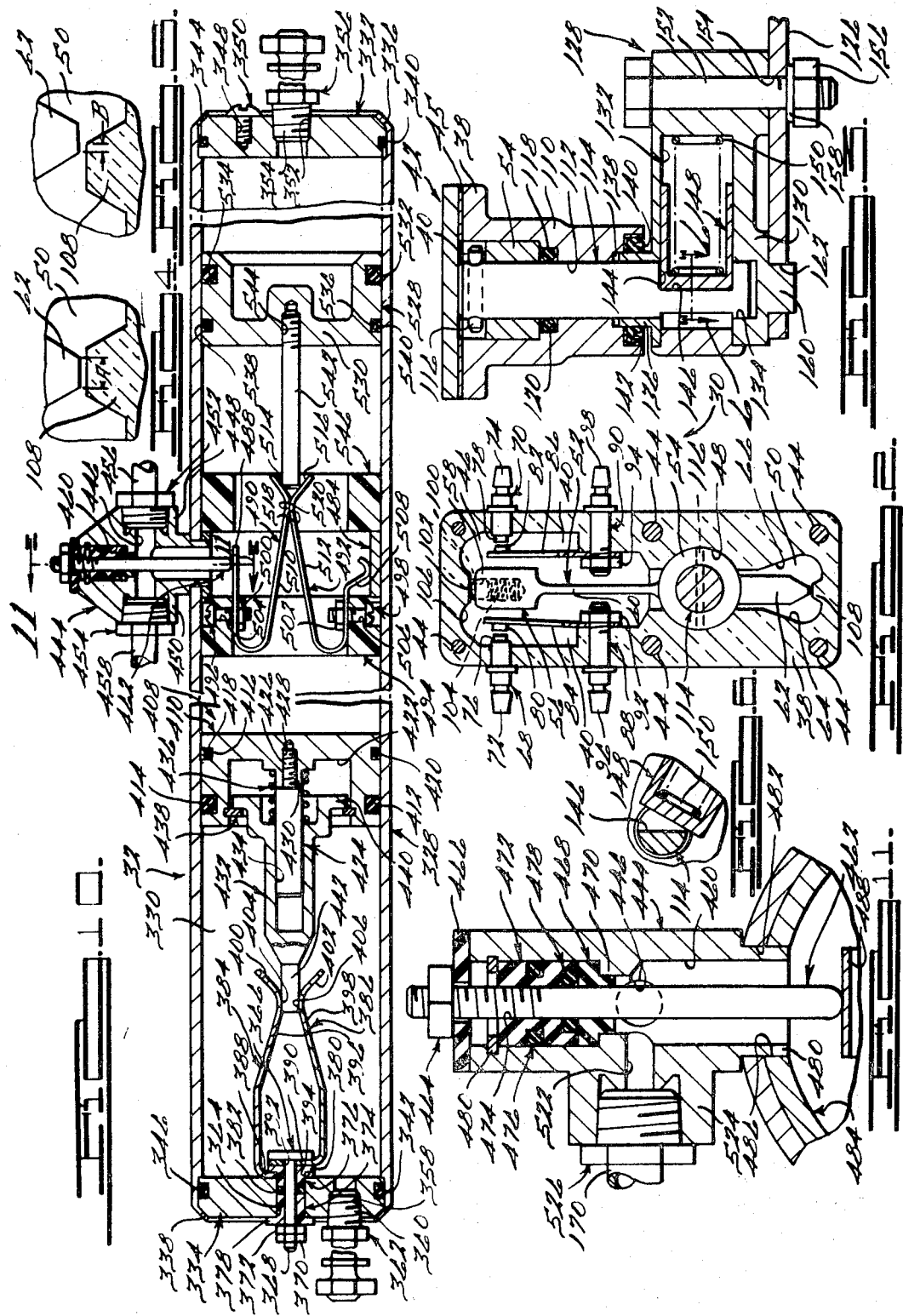

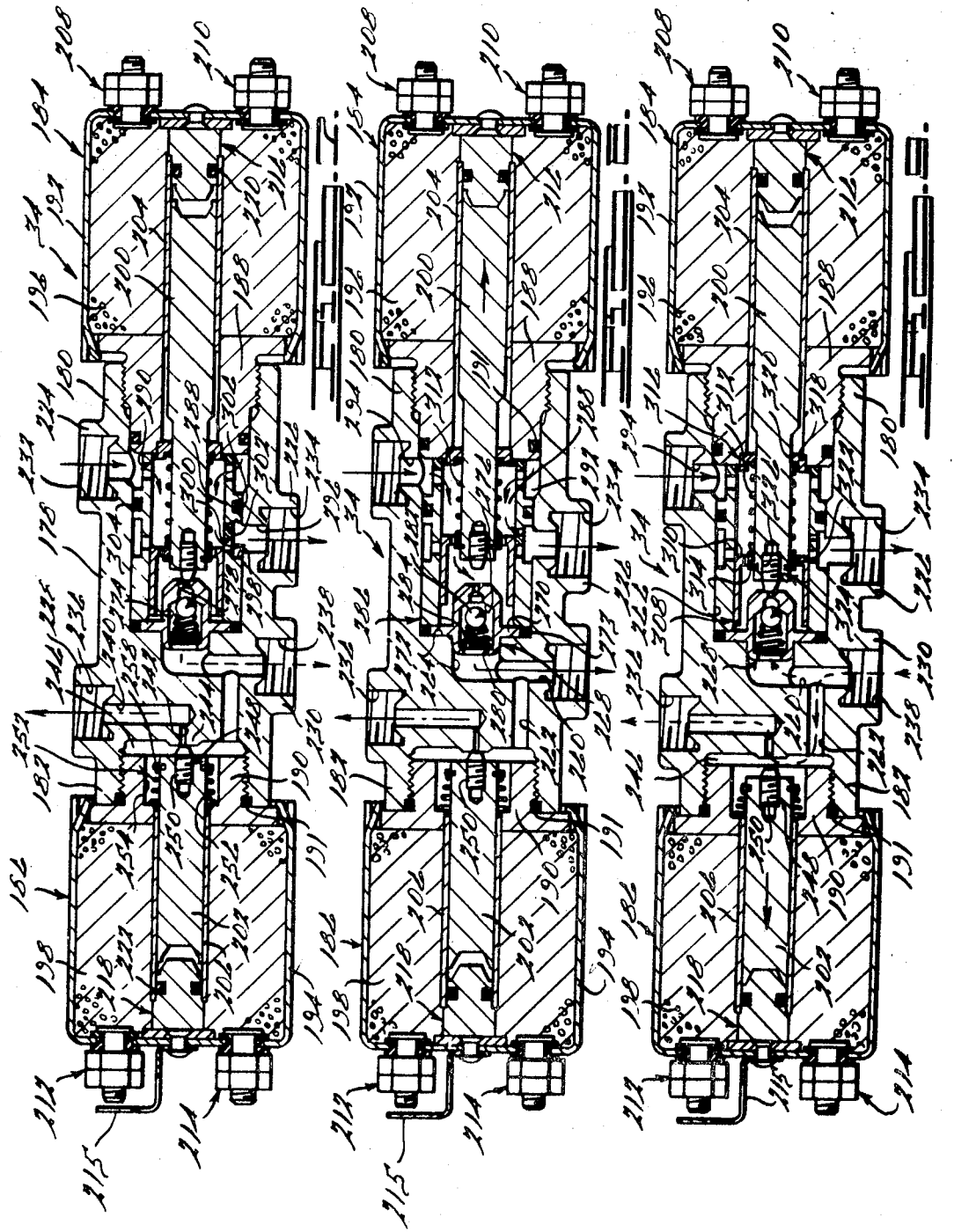

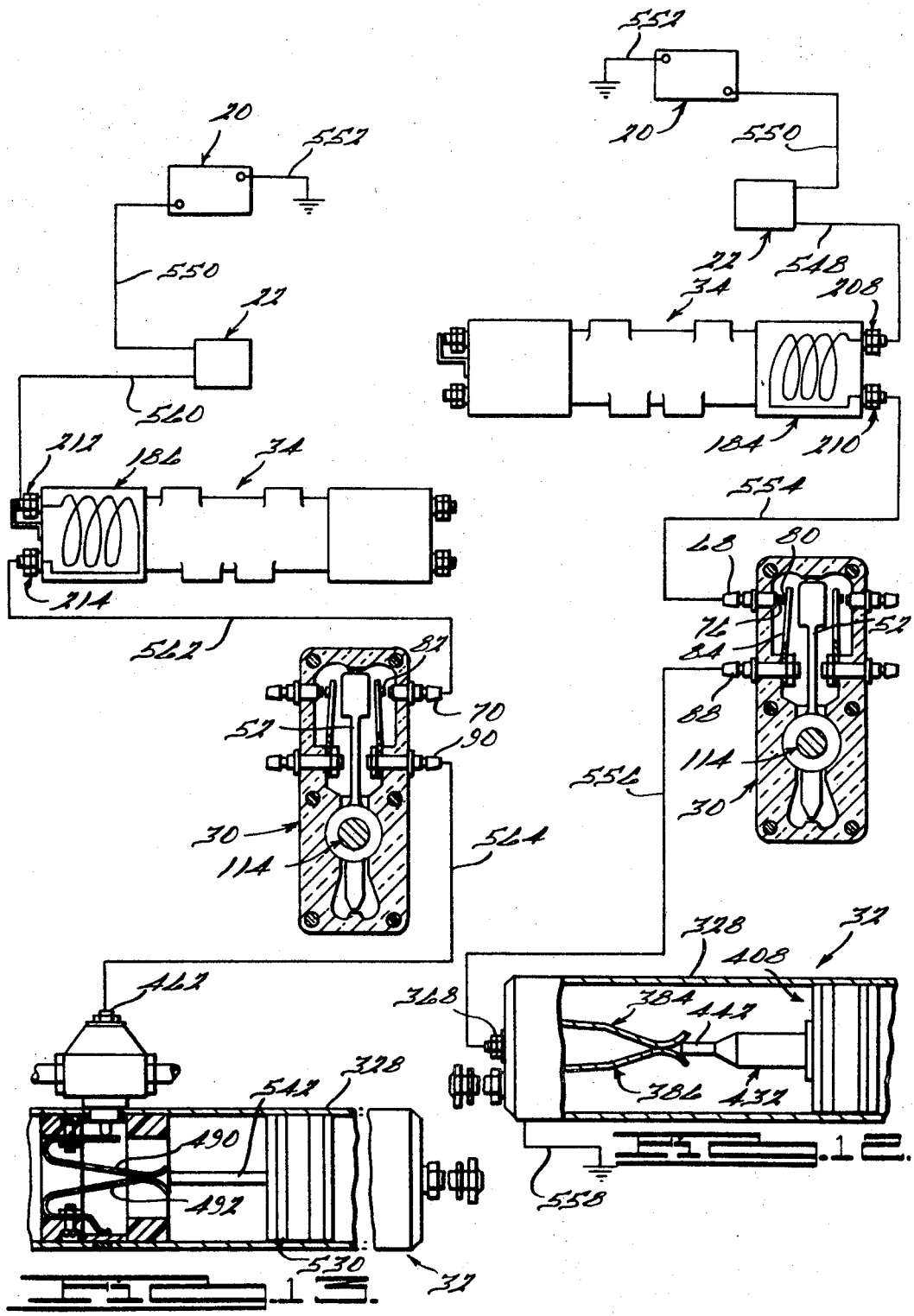

VEHICLE LEVELING SYSTEM

RELATED APPLICATIONS

This is a continuation application of U.S. application, Ser. No. 722,506, now U.S. Pat. No. 3,539,744 filed Jan. 8, 1968, for Combination Electrical Switch and Fluid Accumulator Chamber.

BACKGROUND OF THE INVENTION

During the last several years, the need for greater load-carrying capacity in automotive vehicles has continuously increased. This need has resulted from various factors such as increased vehicle dimensions, larger engines, and the more frequent use of automobiles for pulling trailers and the like and for carrying as many as six passengers along with heavy loads such as baggage, merchandise and sporting equipment. These uses have substantially increased the loads imposed upon the vehicle suspension systems at the rear end of the vehicles, causing a serious reduction in the clearance between the rear axles of the vehicles and the frame or body portions thereof. This, of course, has resulted in frequent bottoming or engagement of these portions of the vehicles when the vehicles are driven over bumpy roads and the like, thus eliminating to a large extent the effectiveness of the vehicle suspension systems. In addition, when the vehicle rear ends are heavily loaded, the front ends of the vehicles are disposed considerably above the rear portions thereof, thereby causing the vehicle's headlight beams to be directed upwardly and also serious impairment of rearward vision. Also, when the rear ends of vehicles are disposed below the front ends thereof, the vehicles lose a certain amount of stability required for high-speed turns made on modern turnpikes, expressways, toll roads and the like.

The seriousness of these problems has heretofore been recognized in the automobile industry, as evidenced by the development of a large variety of auxiliary suspension units which frequently take the form of coil springs, flat leaf springs, air cylinders and the like; however, it has been found that when such auxiliary suspension components have been incorporated in existing vehicle suspension systems, the performance and more particularly the balance of such systems is frequently adversely affected. In addition, many of such previously known auxiliary units have been difficult to install; have required the use of special fittings, complex brackets and the like; and have not been universally applicable to various designs and makes of vehicles. Also, in many instances such auxiliary units have materially affected the attitude of the vehicles when they are unloaded, i.e., they frequently raise the rear ends of the vehicles relative to the axles thereof, thus adversely affecting the appearance of the vehicles and the overall ride characteristics thereof when the vehicles are substantially unloaded or only lightly loaded.

SUMMARY OF THE INVENTION

This invention relates generally to a new and improved vehicle leveling system adapted to automatically maintain the body portion of a vehicle in a substantially level attitude regardless of the degree of loading imposed thereon. More particularly, the present invention relates to a vehicle leveling system of the above character adapted to pump a preselected quantity of an actuating fluid to and from an associated leveling mechanism, such as the vehicle's shock absorbers or the like, in accordance with preselected changes in the attitude of the spring-supported body portion of the vehicle with respect to the unsprung supported axle portion thereof.

It is accordingly a primary object of the present invention to provide a new and improved vehicle leveling system adapted to overcome the heretofore encountered problems associated with heavily loaded automotive vehicles.

It is another object of the present invention to provide a new and improved vehicle leveling system of the above character which is adapted to utilize the power steering fluid or similar source of actuating fluid to cause preselected expansion or contraction of the vehicle's shock absorbers and thereby correct any change in attitude of the rear end of vehicle body with respect to the rear axle assembly thereof.

It is still another object of the present invention to provide a new and improved leveling system of the above character which is entirely automatic in operation and which is adapted to be used on virtually all types of automotive vehicles, thereby providing for universality of installation.

It is still another object of the present invention to provide a new and improved leveling system of the above character that is extremely stable in operation and which is not prematurely energized when the vehicle is braking, accelerating or traversing a road bump or the like.

It is a further object of the present invention to provide a new and improved leveling system of the above character which is durable in operation and may be easily installed on a vehicle.

It is yet another object of the present invention to provide an improved leveling system which exhibits relatively low spring rate characteristics to reduce frequency of oscillation as the vehicle traverses a road bump or the like.

It is still a further object of the present invention to provide a new and improved leveling system of the above character that is of a relatively simple design, consists of readily available component parts and is therefore economical to commercially manufacture.

Other objects, features and advantages of the present invention will become apparent from the following detailed description, taken in conjunction with the accompanying drawings.

BRIEF DESCRIPTION OF THE DRAWINGS

FIG. 1 is a schematic illustration of an exemplary embodiment of the leveling system of the present invention shown in association with various component members of a conventional automotive vehicle or the like;

FIG. 2 is a transverse cross-sectional view of the leveling switch assembly incorporated in the leveling system of the present invention;

FIG. 3 is a transverse cross-sectional view of the portion of a lost motion assembly associated with the switch assembly illustrated in FIG. 2;

FIG. 4 is an enlarged view of a portion of the switch assembly illustrated in FIG. 2;

FIG. 5 is a view similar to FIG. 4 and illustrates the switch element portion thereof in a slightly offset position;

FIG. 6 is a transverse cross-sectional view taken along the line 6—6 of FIG. 3, with the piston member shown therein displaced slightly;

FIG. 7 is a longitudinal cross-sectional view of the distribution valve assembly incorporated in the leveling system of the present invention;

FIG. 8 is a view similar to FIG. 7 with the loading solenoid thereof in an energized condition;

FIG. 9 is a view similar to FIG. 7 with the unloading solenoid thereof in an energized condition;

FIG. 10 is a longitudinal cross-sectional view of the fluid accumulator assembly incorporated in the leveling system of the present invention;

FIG. 11 is an enlarged fragmentary cross-sectional view of a portion of the structure illustrated in FIG. 10, as taken substantially along the line 11—11 thereof;

FIG. 12 is a schematic view of the loading portion of the electrical circuitry of the leveling system of the present invention; and FIG. 13 is a schematic view of the unloading portion of the electrical circuitry of the leveling system of the present invention.

DETAILED DESCRIPTION OF THE PREFERRED EMBODIMENT

For convenience of description, the terms "upper," "lower," "front," "rear," and words of similar import will have reference to the various assemblies of the leveling system of the present invention described hereinafter in detail. Likewise, the terms "inner," "outer," and derivatives thereof will have reference to the geometric center of such assemblies and the various component parts thereof.

Referring now in detail to the drawings, a vehicle leveling system 10, in accordance with an exemplary embodiment of the present invention, is shown in operative association with various component members of a conventional automotive vehicle. More particularly and as best seen in FIG. 1 of the drawings, the leveling system 10 is shown in operative association with an automobile power steering system comprising a power steering unit 12 and a power steering valve mechanism 14 which is attached to one end of the vehicle's steering linkage 16 adjacent a power steering cylinder 18. The leveling system 10 of the present invention is also shown in association with an automobile battery 20, ignition switch 22, and rear axle suspension system comprising an axle assembly 24 and a pair of conventional hydraulically expandable shock absorbers 26 and 28. It may be noted that the aforesaid component members 12 through 28 are not considered to be a material part of the leveling system 10 of the present invention and are incorporated herein merely for purposes of illustrating a typical operative environment of said system.

Generally speaking, the leveling system of the present invention comprises three separate but cooperative assemblies which function to pump the power steering fluid of the aforesaid power steering system to and from the shock absorbers 26 and 28 to effect raising and lowering of the vehicle chassis or body with respect to the axle assembly 24 in response to various load conditions imposed upon the vehicle, whereby the vehicle body is continuously maintained at a substantially level attitude. The aforesaid assemblies, which are hereinafter described in detail, comprise a leveling switch assembly 30 that functions to sense the differential attitude between the axle assembly 24 and the vehicle body, a fluid accumulator assembly 32 which functions to selectively communicate power steering fluid to the aforesaid shock absorbers 26, 28 in response to actuation of the leveling switch assembly 30, and a distribution valve assembly 34 which functions to selectively control the rate and quantity of power steering fluid transmitted between the power steering system and the fluid accumulator assembly 32. The valve assembly 34 comprises a pair of solenoid valve members which are adapted to be electrically energized by power supplied from the vehicle's electrical system, i.e., battery 20, generator, etc., at such time as certain electrical circuits within the system 10 are closed, at which time the power steering fluid is pumped to and allowed to flow from the fluid accumulator assembly 32 and shock absorbers 26, 28, in the manner hereinafter to be described in detail.

Referring now in detail to FIGS. 1, 2 and 3, the leveling switch assembly 30 is adapted to be mounted on a spring supported portion of the automotive vehicle such as the vehicle body adjacent an unsprung portion thereof. In the exemplary embodiment of the present invention illustrated in FIG. 1, the switch assembly 30 is adapted to be supported adjacent the rear axle assembly 24 of the vehicle, as for example, by a suitable support bracket 36 mounted within the rear wheel housing (not shown) or the like. The assembly 30 comprises a generally rectangular shaped housing 38 that may be constructed of a die cast or molded corrosion-resistant material, such as aluminum, plastic or the like, and which defines a central compartment, generally designated by the numeral 40. As illustrated in FIG. 3, one side of the compartment 40 is closed by a cover plate 42 which is coextensive of the one side of the housing 38 and rigidly secured thereto by suitable screws, bolts or the like 44. Suitable gasket means 45 is interposed between the plate 42 and the adjacent side of the housing 38 to provide a fluid-tight seal therebetween. Preferably, the support bracket 36 is rigidly secured to the cover plate 42, as best seen in FIG. 1. The compartment 40 comprises three subcompartments or sections, namely, an elongated contact and switch element section 46, a circular support section 48, and an orifice section 50. Disposed within the chamber 40 is an elongated switch element, generally designated 52, comprising a central cylindrical section 54 which is concentrically and rotatably mounted within the support section 48 of the compartment 40. Extending upwardly from and integrally connected to the section 54 is a contact engaging arm 56 having a head portion 58 and an intermediate spring arm portion 60. Extending in the opposite direction from the arm 56 is a relatively short arm 62 which is also integrally connected to the section 54 and movable in the opposite direction from the aforesaid arm 56 upon pivotal movement of the switch element 52 relative to the housing 38, as will be apparent. The opposite sides of the orifice section 50 of the compartment 40 are inclined, as seen at 64 and 66, to prevent any interference between the arm 62 and said side walls during the aforesaid pivotal movement.

A pair of terminals 68 and 70 are mounted in the opposite sides of the housing 38 adjacent the upper end thereof, which terminals have outer portions 72 and 74, respectively, adapted to be connected to suitable electric circuitry later to be described. The terminals 68 and 70 also comprise inner portions 76 and 78, respectively, which extend inwardly into the section 46 of the compartment 40 and are adapted to be engaged by a pair of contacts 80 and 82 rigidly secured to the outer sides of a pair of cantilever supported contact spring elements 84 and 86, respectively, extending upwardly within the section 46 of the compartment 40 from an intermediate portion thereof. The lower ends of the spring elements 84 and 86 are rigidly secured within the compartment 40 by means of a pair of terminal bolts 88 and 90 which have suitable nuts 92 and 94 threadably mounted on their inner ends and have terminal sections 96 and 98, respectively, extending outwardly from the opposite sides of the housing 38 directly below the terminals 68 and 70, respectively. It will be seen that upon pivotal movement of the arm 56 of the switch element 52 toward the left or in a counterclockwise direction in FIG. 2, the head portion 58 thereof will engage the contact spring element 84 and bias the contact member 80 into engagement with the contact portion 76 of the terminal 68, thereby completing a circuit between the terminal bolt 88 and the terminal 68. In a similar manner, upon pivotal movement of the arm 56 of the switch element 52 toward the right, or in a clockwise direction in FIG. 2, the head portion 58 will engage the contact spring element 86 and bias the contact member 82 into engagement with the contact portion 78 of the terminal 70, thereby completing a circuit between the terminal 70 and the bolt 90. The head portion 58 of the switch element 52 is formed with a central longitudinally extending bore or recess 100 within the upper end of which a ball detent 102 is located. The detent 102 is resiliently urged upwardly or toward the upper end of the housing 38 by means of a suitable coil spring or the like 104 interposed between the detent 102 and the lower end of the recess 100. The upper end of the contact section 46 of the chamber 40 is formed with a downwardly extending boss portion 106 within which a suitable hemispherical recess is formed for receiving a portion of the ball detent 102. The detent 102 is adapted to delay the head portion 58 of the switch element 52 from moving toward either of the contact spring elements 84 or 86 until the switch element 52 is pivoted a predetermined amount relative to the housing 38, for purposes later to be described.

Means for further delaying movement of the head portion 58 upon pivotal movement of the switch element 52 within the compartment 40 is achieved through the provision of a relatively high viscosity fluid within the sections 46 and 50 of the compartment 40. The fluid is preferably a silicon or equivalent material having a viscosity of from 30,000 to 300,000 centistrokes and preferably in the order of 60,000 centistrokes. At such time as the support section 54 of the switch element 52 rotates or pivots relative to the housing 38, movement of the arm 56 of the switch element 52 will be resisted by the silicon material disposed within the compartment 40. The switch element 52 is preferably constructed of a relatively flexible material such as nylon or the like so that the portion 60 thereof will be sufficiently flexible to provide for the slightly delayed movement of the contact head portion 58 of the element 52 relative to the support section 54 thereof.

By virtue of the fact that the section 50 of the compartment 40 is also filled with the aforesaid silicon material, pivotal movement of the switch element 52 will also be resisted by the movement of the section 62 of the switch element 52 through the compartment section 50. Resistance to movement of the switch element 52 relative to the housing 38 is also achieved by means of a variable size orifice located between the lower end of the switch element section 62 and a generally trapezoidal shape in boss portion 108 formed on the lower end of the compartment section 50. More particularly, and as best illustrated in FIGS. 4 and 5, when the lower end of the switch element 52 is in substantial registry with the top of the boss portion 108, the length of the orifice between these two members is represented by the dimension A, and the flow rate of the silicon material within the section 50 from one side of the switch section 62 to the opposite side thereof will be relatively slow. However, as the lower end of the switch element section 62 moves out of registry with the upper end of the boss portion 108, the length of the orifice therebetween will be decreased to the dimension B in FIG. 5, whereby the flow rate of the silicon material between the opposite sides of the switch section 62 will be considerably faster. For reasons which will be described in greater detail in connection with the operation of the entire leveling system 10 of the present invention, the provision of the variable size orifice compensates for the change in attitude between the vehicle chassis and the rear axle assembly thereof during starting and stopping of the vehicle.

As best seen in FIG. 3, the housing 38 is formed with a cylindrical shaped section 110 which is in substantially axial alignment with the support section 48 of the compartment 40 and defines a cylindrical bore 112 within which an elongated cylindrical actuating shaft 114 is rotatably mounted. The shaft 114 is fixedly secured to the support section 54 of the switch element 52 by means of a suitable diametrically extending retaining pin 116. A conventional O-ring sealing member 118 is disposed within an annular recess 120 formed circumjacent the support section 48 of the compartment 40, and functions to preclude any leakage of the silicon material between the compartment 40 and the bore 112. The shaft 114 is adapted to be communicable with the axle assembly 24 through a plurality of connecting link members 122, 124 and 126 which are connected together in a manner such that vertical movement of the axle assembly 24 relative to the vehicle body is transmitted to the switch assembly 30. For example, the link 122 is fixedly secured at one end thereof to the axle assembly 24 and at the opposite end thereof to the lower end of the link 124. The upper end of the link member 124 is in turn pivotably connected to the rearward end of the link 126 so that upon relative downward or upward movement of the assembly 24, such as would occur when the vehicle rides over a bump, the link 126 would be pivoted upwardly or downwardly, as indicated by the phantom lines in FIG. 1.

The forward end of the link 126 is adapted to be attached to the outwardly projecting end of the shaft 114 by means of a lost motion assembly best illustrated in FIG. 3 and generally designated by the numeral 128. The assembly 128 comprises a housing or casing 130 which is generally cylindrical in shape and defines a central cylindrical bore 132 which is arranged transversely to the axis of the shaft 114. The casing 130 is also formed with a cylindrical bore 134 which intersects the aforesaid bore 132 and is adapted to receive the outer end of the shaft 114 therewithin. An outwardly extending sleeve section 136 is formed on one side of the casing 130 circumjacent the bore 134 and is adapted to be received in a suitable annular recess 138 formed around the periphery of the bore 112 at the outer end of the cylindrical section 110 of the housing 38. A suitable gland nut or the like 140 is threadably received within a recess 142 formed circumjacent the recess 138 for retaining the sleeve section 136 within the recess 138 of the housing 38.

The outer end of the shaft 114 is formed with a recessed portion 144 which defines a flat or planar facet 146 that is axially aligned with the bore 132 in the casing 130. A cylindrical cup-shaped piston or plunger member 148 is reciprocally or slidably disposed within the bore 132 and is resiliently urged into engagement with the flat 146 by means of a coil spring or the like 150 interposed between the back (right) side of the piston member 148 and the right end of the bore 132. The left end of the link 126 is rigidly secured to the casing 130 by means of a suitable screw, bolt or the like 152 which extends through one end of the casing 130 and an aperture 154 in the link 126. The bolt 152 is provided with a suitable nut 156 and lockwasher 158, as best seen in FIG. 3. An annular boss 160 is integrally formed on the casing 130 and extends through a suitable aperture 162 in the end of link 126 to prevent any relative rotation of this member with respect to the casing 130.

The aforedescribed construction is adapted to provide for limited lost motion or differential movement between the link 126 and the shaft 114 so that the link 126 can pivot upwardly and downwardly relative to the housing 38 without rotating the shaft 114. More particularly, the casing 130 and link 126 rigidly secured thereto are adapted to rotate a preselected amount relative to the shaft 114, whereby the piston member 148 will be biased toward the right in FIG. 3 against the resistance of the coil spring 150. During such movement of the members 130 and 126, the shaft 114 will not rotate; however, at such time as the spring 150 is compressed a predetermined amount, for example, when the casing 130 has moved the piston member 148 to the position shown in FIG. 6, the piston member 148 will exert sufficient force against the flat 146 on the shaft 114 that any further pivotal movement of the casing 130 and link 126 will cause the shaft 114 to rotate relative to the housing 38, resulting in the switch element 52 engaging one of the spring elements 84 or 86 to cause the contact members 80 or 82 mounted thereon to engage one of the terminal members 78 or 70, as hereinabove described. The overall function of the switch assembly 30 will be more clearly understood when the operation thereof is later described in connection with the operation of the entire vehicle leveling system 10 of the present invention.

Referring now in detail to the construction of the distribution valve assembly 34, as best seen in FIG. 1, the valve assembly 34 is communicable with the power steering fluid circuit which circulates power steering fluid between the power steering unit 12, the power steering valve mechanism 14, and the accumulator assembly 32. More particularly, the valve assembly 34 is communicable with a pair of fluid conduits 164 and 166, the latter of which extends between the pump section 168 of the power steering unit 12 and the assembly 34, and the former of which extends between the valve assembly 34 and the power steering valve mechanism 14, whereby the valve assembly 34, when deenergized, permits normal free fluid flow between the conduits 164 and 166. Conversely, when the assembly 34 is appropriately energized, a portion of the fluid normally flowing through the conduits 164, 166 is communicated through a conduit 170 which extends longitudinally of the vehicle between the fluid accumulator assembly 32 and the assembly 34. The conduit 170 is communicable through the valve assembly 34 with a conduit 172 extending between the assembly 34 and the reservoir section 174 of the power steering unit 12. Other circuitry including a conduit 176 is provided for communicating power steering fluid from the valve mechanism 14 back to the power steering unit 12.

Referring now to FIGS. 7 through 9, the valve assembly 34 comprises a central valve housing 178 which is formed with a pair of substantially identical internally threaded hollow end sections 180 and 182. The assembly 34 is provided with a pair of electrically energized solenoids, generally designated 184 and 186, which include externally threaded mounting or adaptor sections 188 and 190 that are respectively threadably received within the sections 180 and 182 of the housing 178. Suitable O-ring sealing means 191 are preferably provided between the adaptor sections 188, 190 and the sections 180 and 182 of the housing 178 to provide fluid-tight joints therebetween. The solenoids 184, 186 include external casing portions 192 and 194 enclosing coils 196 and 198, respectively, which are of conventional design and function to effect longitudinal reciprocal movement of a pair of solenoid armatures 200 and 202 that are located along the longitudinal axis of the assembly 34 within a pair of cylindrical sleeves 204 and 206 mounted within the coils 196 and 198, respectively. A pair of terminals 208, 210, and 212, 214 are located at the opposite ends of the solenoids 184 and 186, respectively, and are adapted to communicate electric current to these devices to effect energization thereof, whereby the armatures 200 and 202 move longitudinally of the assembly 34 in a manner later to be described. One or more generally L-shaped sheaths 215 may be provided on the outer ends of the solenoids 184, 186 to protect the terminals 208, 210, 212 and 214 thereof. A pair of end plugs 216 and 218 are disposed at the outer ends of the sleeves 204 and 206, respectively, and are provided with suitable O-ring sealing means 220 and 222 to prevent any fluid leakage between the interior of the sleeves 204, 206 and the exterior of the assembly 34.

The housing 178 of the valve assembly 34 is formed with four internally threaded mounting sections 224, 226, 228 and 230, that define bores 232, 234, 236 and 238, respectively, adapted to receive suitable fluid fittings (not shown) which communicate the valve assembly 34 with the fluid conduits 166, 164, 172 and 170, respectively. The bore 236 is communicable with a downwardly extending fluid passage 240 which terminates within the housing 178 intermediate the upper and lower sides thereof. A longitudinally extending fluid passage 242 is communicable at one end thereof with the lower end of the passage 240 and terminates at its opposite end in a valve seat section 244 formed within a cavity 246 defined within the end section 182 of the housing 178. The armature 202 of the solenoid 186, (hereinafter referred to are the unloading solenoid 186 for reasons that will later be apparent) is provided with a longitudinally extending valve member 248 that is threadably mounted with a suitable axially extending bore 250 formed in the right end thereof. The valve member 248 is normally resiliently engaged with the valve seat section 244 by means of a coil spring 252 thereby blocking communication between the passage 242 and the cavity 246. The spring 252 extends coaxially of the right end of the armature 202 within an annular recess 254 formed within the adaptor section 190 of the unloading solenoid 186. The spring 252 bears at one end against an annular shoulder 256 on the adaptor section 190, and at the opposite end against a suitable retaining or snap-ring 258 mounted on the right end of the armature 202. Upon energization of the unloading solenoid 186, the armature 202 will move axially toward the left in FIG. 7 through 9, whereby the valve member 248 will move out of engagement with the valve seat section 244 to permit fluid flow between the fluid passage 242 and the cavity 246. At such time as the unloading solenoid 186 is deenergized, the spring 252 will resiliently urge the armature 202 toward the right and reengage the valve member 248 with the valve seat section 244, thereby blocking fluid flow between the passage 242 and the cavity 246.

The bore 230 is communicable at its upper end with an upwardly extending fluid passage 260 which terminates at a position substantially intermediate the upper and lower sides of the housing 178, and is communicable with the above described cavity 246 by means of a longitudinally extending passage 262. The passage 260 is also communicable through a longitudinal passage section 264 with a generally cylindrical shaped valve cavity 266 extending longitudinally within the valve housing 178. Disposed within the left end of the cavity 266 is a generally cylindrical shaped check valve housing 268 having a radially outwardly extending flange portion 270 which abuts against a radially extending shoulder 272 at the left end of the cavity 266. Sealing means in the form of a conventional O-ring or the like 273 is preferably provided between the outer periphery of the flange portion 270 and the inner periphery of the left end of the valve cavity 266, as illustrated. The left end of the housing 268 extends partially within the passage section 264 and is formed with a central annular bore 274, the right end of which defines a valve seat 276 that is communicable with the interior of the cavity 266 by means of a relatively small diameter bore 278. The opposite (left) end of the bore 274 is communicable with the passage section 264 by means of an opening 280 formed in the left end of the housing 268. Fluid flow between the cavity 266 and the interior of the housing 268 is normally blocked by means of a spherical check valve member 282 which is resiliently urged into engagement with the valve seat 276 by means of a valve spring 284 that is located within the bore 274.

Disposed within cavity 266 is an elongated cylindrical valve insert member, generally designated 286, which defines a uniform diameter cylindrical bore 288 extending coaxially of the cavity 266 and having the left end of the armature 200 extending centrally within the right end thereof. Preferably, the insert member 286 is fixedly secured within the cavity 266 by being compressed between the flange portion 270 of the check valve housing 268 and the left end of the adaptor section 188 of the solenoid 184 (hereinafter referred to as the loading solenoid 184 for reasons that will later be apparent). The right end of the insert member 286 is formed with a plurality of circumferentially spaced radially inwardly extending ports or openings, generally designated 290, which communicate the central bore 288 with an annular recess 292 defined around the outer periphery of the right end of the member 286. The bore 252 of the housing section 224 is communicable with the annular recess 292 by means of a fluid passage 294, whereby fluid communicated to the section 224 is in continuous communication with the interior of the bore 288.

The interior of the bore 288 is also communicable with the bore 234 of the housing section 226 through an upwardly extending fluid passage 296 formed in the valve housing 178, and through an annular recess 298 and a plurality of radially inwardly extending ports or bores, generally designated 300, which are formed in the insert member 286 radially inwardly from the recess 298. The bore 288 is also communicable with the annular recess 298, and hence with the fluid passage 296, by way of one or more openings 302 formed in the valve insert member 286 adjacent the ports 300, as seen in FIGS. 7 through 9. Fluid flow between the annular recess 292 and the recess 298 is prevented by means of a suitable O-ring sealing member 304 disposed within an annulus 306 formed around the outer periphery of the insert member 286.

Slidably or reciprocally mounted within the bore 288 is a cylindrical sleeve valve member, generally designated 308, the outer periphery of which slidingly, yet sealingly, engages the periphery of the bore 288. The valve member 308 is formed with a radially inwardly extending section 310 at the right end thereof which terminates at its radially inner edge adjacent the outer periphery of the left end of the loading solenoid armature 200. The valve member 308 is slidably carried upon the left end of the plunger 200 and is secured thereto by having the section 310 thereof compressed between the left end of a helical coil spring 312, which extends coaxially around the left end of the armature 200, and a radially outwardly extending snap-ring or the like 314 mounted on the left end of the armature 200. The right end of the spring 312 bears against an annular disk 316 located in a recess 318 at the left end of the adaptor section 188 of the loading solenoid 184. As illustrated, the disk 316 is formed with a central aperture 320 through which the left end of the armature 200 extends. The opposite ends of the bore 288 are communicable with each other by means of a plurality of circumferentially spaced and longitudinally extending ports, generally designated 322, formed in the radially inwardly extending section 310 of the valve member 308, and fluid communication between the left end of the bore 288 and the bore 278 in the check valve housing 268 is adapted to be blocked by means of a valve member 324 threadably mounted in a suitable bore 326 formed in the left end of the armature 200, as illustrated in FIGS. 7 and 9.

It will be seen that upon energization of the loading solenoid 184, the armature 200 will move toward the right, as seen in FIG. 8, whereby the valve member 324 will move out of engagement with the check valve housing 268 to provide for fluid communication between the bore 288 and the bore 274. As the armature 200 thus moves, the sleeve valve 308 simultaneously moves toward the right within the valve insert member 286 to block the fluid flow through the plurality of ports 300. It will be noted, however, that the valve member 308 does not move into registry with the openings 302 so that a limited amount of fluid flow is provided between the bore 288 and the fluid passage 296. Upon deenergization of the loading solenoid 184, the coil spring 312 will bias the armature 200 toward the left, whereby the valve member 324 will move into engagement with the right end of the check valve housing 268 to block fluid flow between the bores 273 and 288. Simultaneously, the sleeve valve member 308 will move out of registry with the ports 300 to permit fluid flow from the interior of the bore 288 to the annular recess 298 through the ports 300. A more detailed description of the sequential operation of the valve assembly 34 will be given in connection with the description of the overall operation of the leveling system 10 of the present invention.

Referring now in detail to the construction of the fluid accumulator assembly 32, as best seen in FIGS. 10 and 11, the assembly 32 comprises an elongated cylindrical housing 328 which defines a central accumulator chamber 330. The opposite ends of the housing 328 are closed by end header members 332 and 334 that have beveled outer edges 336 and 338, respectively, which enable the ends of the housing 328 to be crimped or similarly deformed radially inwardly over the outer edges thereof to fixedly secure the members 332, 334 to the housing 328. Suitable sealing members 340 and 342 are disposed within annular recesses 344 and 346 formed around the outer peripheries of the header members 332 and 334, respectively, for providing fluid-tight seals at the opposite ends of the housing 328. The end header 332 is formed with a threaded bore 348 adapted to have a screw, bolt or the like 350 threadably mounted therewithin for attaching a ground conductor (not shown) to the member 332, whereby to ground the accumulator assembly 32 to the vehicle body. The header member 332 is also formed with a central internally threaded bore 352 adapted to threadably receive a mounting section 354 of a gas valve assembly 356, which assembly 356 is adapted to be used for communicating a gaseous substance into the interior of the chamber 330, as will later be described. The header member 334 is also formed with an internally threaded bore 358 adapted to threadably receive a mounting section 360 of a gas valve assembly 362 which is substantially identical in construction to the aforementioned assembly 356 and is also adapted to communicate a gaseous substance into the interior of the chamber 330. The member 334 is also formed with a central bore 364 adapted to have a terminal screw, bolt or the like 366 inserted therethrough. More particularly, the terminal bolt 366 is formed with a threaded outer (left) end section 368 adapted to have a pair of nuts 370, 372 threaded thereon for securing thereto one of the electrical conductors later to be described. The bolt 366 is mounted within a pair of dielectric insulating members 374 and 376 which are interposed between the outer periphery of the bolt 366 and the inner periphery of the bore 364, as illustrated in FIG. 10. The members 374, 376 are formed with radially outwardly extending flange sections 378 and 380, respectively, which are located adjacent the inner and outer sides of the header member 334 to prevent any axial movement of the members 374, 376 relative thereto. A suitable O-ring sealing member 382 is interposed between the adjacent ends of the members 374 and 376 for providing a gas-tight seal within the bore 364.

The bolt 366 is adapted to support a pair of terminal clip members 384 and 386 within the left end of the housing 328. The members 384, 386 are preferably constructed of a resilient current conductive material, and are formed with transversely extending mounting sections 388 and 390 at the left ends thereof. The section 390 of the clip member 386 is formed with a central bore 392 adapted to have the terminal bolt member 366 inserted therethrough, and the section 388 of the clip member 384 is formed with a central bore 394 adapted to have the insulating member 376 inserted therethrough, as illustrated in FIG. 10. It will be noted that the clip members 384 and 386 are insulated from one another at their left ends by the flange section 380 of the member 376. However, the members 384 and 386 have converging sections 396 and 398, and diverging sections 400 and 402 which define normally engaged face portions 404 and 406, respectively. It will be seen that the mounting section 388 of the clip member 384 abuts against the inner side of the header member 334 which is grounded to the vehicle chassis through the housing 328, header member 332 and the ground wire connected thereto by the screw 350. Accordingly, the clip members 384 and 386 normally complete an electrical circuit between the terminal bolt member 366 and the vehicle chassis, which circuit will be broken at such time as the clip members 384, 386 are separated or biased apart in the manner hereinafter to be described.

As illustrated in FIG. 10, a piston assembly, generally designated 408, is slidably or reciprocally mounted within the left end of the housing 328. The assembly 408 comprises a generally cup-shaped piston member 410, the outer periphery of which is provided with an O-ring sealing member 412 nested within a suitable annular recess 414 for slidably, but sealingly, engaging the inner periphery of the housing 328. Another O-ring member 416 is nested within a second annular recess 418 formed around the periphery of the piston member 410 adjacent the left end thereof, which O-ring 416 is adapted to resiliently urge a Delrin or similar type anti-friction bearing ring 420 that is disposed within the recess 418 radially outwardly toward the inner periphery of the housing 328 to provide a slidable fluid-tight seal therebetween. The piston member 410 is formed with a central annular recess 422 within which an elongated cylindrical shaft 424 is disposed. The shaft 424 is formed with a reduced diameter externally threaded section 426 at the left end thereof which is threadably received within a suitable bore 428 located in a mounting section 430 that is integrally formed within the recess 422, whereby the shaft 424 extends outwardly from the left side of the piston member 410 coaxially of the housing 328. The shaft 424 is adapted to support a plunger 432 for reciprocal movement relative to the piston member 410, which plunger 430 is formed with a central bore 434 adapted to receive the outer or left end of the shaft 424, as illustrated in FIG. 10. The plunger 432 is resiliently urged toward the left end of the shaft 424 by means of a helical coil spring 436 which is disposed circumjacent the right end of the shaft 424 and a portion of the mounting section 430 extending coaxially of the shaft 424. Means in the form of a conventional snap-ring or the like 438 is disposed within the recess 422 and adapted to engage a radially outwardly extending shoulder section 440 formed on the right end of the plunger 432 to limit movement of this member toward the left end of the shaft 424. The left end of the plunger 432 is formed with a longitudinally extending cylindrical end section 442 which, upon appropriate longitudinal movement of the assembly 408 relative to the housing 328, is adapted to be inserted between the face portions 404 and 406 of the clip members 384 and 386 to break the electrical circuit normally maintained therebetween.

It will be seen from the above construction that a preselected increase in fluid pressure on the right side of the piston member 410 will move the assembly 408 toward the left within the housing 328, whereby the end section 442 of the plunger 432 will engage the clips 384 and 386; however, the coil spring 436 is selected such that it will be compressed as the plunger 432 initially engages the clips 384, 386 so that the end section 442 will not be interposed between the clip members to break the circuit therebetween until such time as the spring 436 is entirely compressed and the piston member 410 moves further toward the left. With this construction, there is a certain amount of differential movement between the plunger 432 and the piston member 410 to enable the latter to reciprocate within the housing 328 without the end section 442 of the plunger 432 breaking the circuit between the clips 384 and 386. Briefly, the purpose for such an arrangement is to prevent the clips 384 and 386 from being separated when the vehicle traverses small bumps or similar type irregularities in the road surface. Accordingly, the leveling system 10 of the present invention will not be deenergized when there is a temporary change in attitude between the vehicle body with respect to the axle assembly 24 thereof.

Mounted on the top of the housing 328 is a combination fluid fitting and terminal support member, generally designated by the numeral 444. As best seen in FIG. 10, the member 444 is formed with a transversely extending fluid passage 446 which includes enlarged diameter internally threaded sections 448 and 450 adapted to receive fluid fittings 452 and 454, respectively, which are communicable with a pair of fluid conduits 456 and 458, respectively. The opposite ends of the conduits 456 and 458 are communicable with the shock absorbers 28 and 26, respectively, in a manner such that when fluid is pumped to or from the shock absorbers 26, 28 through the conduits 456 and 458, the shock absorbers will expand or contract longitudinally to raise or lower the rear end of the vehicle body with respect to the axial assembly 24, as will later be described. The member 444 is also formed with a generally vertically extending bore 460 which intersects the aforedescribed passage 446 and has an elongated cylindrical terminal rod 462 extending coaxially therethrough. The upper end of the rod 462 is threaded and adapted to receive a suitable nut 464 thereon for attaching an electrical conductor later to be described to the rod 462. An insulating washer 466 is interposed between the nut 464 and the upper end of the member 444 for insulating the nut 464 from the member 444. The rod 462 is supported within the bore 460 by means of an annular guide member 468 which is supported upon a shoulder 470 formed directly above the intersection of the bore 460 with the passage 446, and by an annular retainer cylinder 472 having an internally threaded bore 474 which is threadedly received upon an intermediate portion of the rod 462. Sealing means in the form of a pair of O-rings 476 and 478 are interposed between the outer periphery of the cylinder 472 and the inner periphery of the bore 460, and between the outer periphery of the rod 462 and the inner periphery of the bore 474, respectively, to prevent any fluid leakage through the upper end of the bore 460 or around the rod 462. A retaining ring 480 is provided directly above the upper end of the cylinder 472 to lockingly secure the members 468 and 472 within the bore 460.

The member 444 is formed with a cylindrical shaped mounting section 480 which extends coaxially of the bore 460 and is secured as by welding or the like within an annular opening 482 formed in the upper end of the housing 328 intermediate the opposite ends thereof. An annular metal reinforcing ring 484 extends around the inner periphery of the housing 328 at a position longitudinally aligned with the opening 482, the ring 484 being formed with a suitable opening 486 adapted to receive the lower end of the section 480 of the member 444. It will be seen that the lower end of the rod 462 extends downwardly within the chamber 330 and is adapted to be in contact with the upper end section 488 of a generally J-shaped spring contact 490 disposed within the housing 328 subjacent the member 444. The contact 490, together with an associated contact 442, is supported within the chamber 330 by means of an annular retaining ring 494 which is preferably constructed out of plastic or the like and is formed such that the outer periphery thereof is continuously engaged with the inner periphery of the housing 328, as illustrated in FIG. 10. The contacts 490 and 492 are secured to the inner periphery of the retaining ring 494 by means of suitable screws, bolts or the like 496 and 498, and nuts 500 and 502, the former of which extend through countersunk bores 504 and 506, respectively. The contact 492 is formed with a downwardly extending section 508 which engages the inner periphery of the reinforcing ring 484 so that the contact 492 is in electrical communication with the ground wire secured to the housing 328 by means of the screw 350. The contacts 490 and 492 are formed with converging sections 510, 512, and with diverging sections 514, 516, respectively, which define normally engaged face portions 518 and 520. It will be seen that an electrical circuit is normally completed through the rod 462, the contacts 490 and 492, the reinforcing ring 486, housing 328, end header 332, and the aforesaid ground wire, which circuit will be broken at such time as the face portions 518 and 520 are separated.

The member 444 is formed with another transversely extending fluid passage 522 which, as illustrated in FIG. 11, intersects the passage 446 and bore 460 and extends outwardly therefrom within a mounting section 524 formed on the rearward side of the member 444. The outer end of the passage 522 is internally threaded and is thereby adapted to receive a suitable fluid fitting 526 which connects the conduit 170 with the assembly 32. It will be seen that the power steering fluid pumped through the conduit 170 will flow through the passage 522 into the bore 460 and will thereafter either flow into the housing 328 or through the conduits 456 and 458 to the shock absorbers 26 and 28, as will later be described.

Reciprocally mounted within the right end of the housing 328 is another piston assembly, generally designated 528, which comprises a generally cup-shaped piston member 530, the outer periphery of which slidably engages the inner periphery of the housing 328. An O-ring sealing member 532 is nested within an annular recess 534 formed around the outer periphery of the piston 530 and is adapted to provide a fluid-tight seal between the outer periphery thereof and the inner periphery of the housing 328. Another O-ring member 536 is nested within a second annular recess 538 formed around the periphery of the piston member 530 adjacent the left end thereof, which O-ring 536 is adapted to resiliently urge a Delrin or similar type anti-friction bearing ring 540 that is disposed within the recess 536 radially outwardly toward the inner periphery of the housing 328 to provide a slidable, yet fluid-tight seal therebetween. An elongated cylindrical contact engaging rod 542 extends coaxially within the right end of the housing 328 and is threadably secured at its right end within an internally threaded bore 544 formed in the left side of the piston member 530. The rod 542 is preferably constructed of plastic or similar dielectric material and is adapted to be inserted between the face portions 518 and 520 of the contacts 490 and 492 upon longitudinal movement of the piston assembly 528 toward the left end of the housing 328. It will be seen that when the rod 542 is interposed between the face portions 518 and 520, the contacts 490 and 492 will be biased apart a sufficient amount to open the electric circuit between the terminal rod 462 and the above described ground wire connected to the accumulator assembly 32. Conversely, when the assembly 528 moves toward the right end of the housing 328, the rod 542 will move from between the face portions 518 and 520 to establish electric contact between the members 490 and 492. An annular plastic or similar type spacer ring 546 is disposed within the housing 328 directly on the right side of the reinforcing ring 484 and is adapted to prevent the piston assembly 528 from engaging the ring 484 as the assembly 528 moves toward the left end of the housing 328 during operation of the assembly 32, thereby reducing any noise or vibration which might occur upon engagement of the assembly 528 with the ring 484.

The portion of the housing 328 interjacent the piston assembly 528 and the end header 332 is adapted to be charged with a gaseous substance to provide a cushion which resists movement of the assembly 528 toward the right end of the housing 328. Preferably, this portion of the housing 328 is filled with compressed nitrogen or a similar inert gas at a pressure of approximately 140 p.s.i. In a similar manner, the portion of the housing 328 interjacent the end header 334 and the piston assembly 408 is also charged with a compressed gas, preferably nitrogen, at a pressure of approximately 425 p.s.i., which is adapted to resist movement of the piston assembly 408 toward the left end of the housing 328. It will be seen that when power steering fluid from the vehicle's power steering unit 12 is pumped through the conduit 170 to the member 444, a portion of the fluid will flow through the passage 522 and bore 460 into the central portion of the housing 328 defined between the piston members 410 and 530. The remaining portion of the fluid pumped through the conduit 170 will flow through the conduits 456 and 458 to the shock absorbers 26 and 28. When the hydraulic pressure within the shock absorbers 26 and 28 exceeds 140 p.s.i. (the pressure of the compressed nitrogen behind the piston assembly 528), the piston member 530 will move to the right within the housing 328 against the resistance of the compressed nitrogen. Likewise, when the hydraulic pressure within the shock absorbers 26 and 28 exceeds 425 p.s.i. (the pressure of the compressed nitrogen behind the piston assembly 408), the piston member 410 will move toward the left end of the housing 328, as will later be described.

Referring now to the electrical circuit incorporated in the leveling system 10 of the present invention and in particular to FIG. 12, it will be seen that the terminal 208 of the loading solenoid 184 is connected to the vehicle's ignition switch 22 by means of a suitable conductor 548, the switch 22 in turn being connected by means of a conductor 550 with a source of electrical energy such as the vehicle battery 20 which is grounded in a conventional manner by a conductor 552. The opposite terminal 210 of the loading solenoid 184 is adapted to be connected to the terminal 68 of the switch assembly 30 by means of a suitable conductor 554. The terminal 88 of the switch assembly 30 is connected through a conductor 556 to the terminal bolt 366 mounted in the end header 334 of the accumulator assembly 32. As above stated, the accumulator housing 328 is adapted to be grounded by means of a suitable conductor connected to the assembly 32 by the screw 350 (see FIG. 10), which conductor 15 is representatively illustrated in FIG. 13 by the conductor 558. It will be seen from this circuit that the loading solenoid 184 is normally not energized, since the contact 80 in the switch 30 is not engaged with the inner portion 76 of the terminal member 68. However, assuming that the shaft 114 in the switch assembly 30 has been rotated a predetermined amount due to a change in the attitude between the vehicle body and the axle assembly 24, the arm 56 will bias the spring element 84 toward the left and thereby engage the contact member 80 with the terminal member 68 to complete the above circuit, resulting in energization of the loading solenoid 184. Assuming that the ignition switch 22 remains on, this circuit will remain closed until either of two things occur, namely, the shaft 114 rotates sufficiently to permit the arm 56 to move toward the right and thereby enable the contact member 80 to move out of engagement with the terminal member 68 or, the plunger member 432 moves between and separates the clip members 384 and 386 in the accumulator assembly 32.

Referring now to the schematic wiring diagram illustrated in FIG. 13, it will be seen that the terminal member 212 of the unloading solenoid 186 is connected to the ignition switch 22 by a suitable conductor 560, which switch 22 is in turn connected to the vehicle battery 20 by means of the aforementioned conductor 550. The opposite terminal 214 of the unloading solenoid 186 is connected to the terminal member 70 of the switch 30 by means of a suitable conductor 562, and the terminal 90 of the switch assembly 30 is connected to the upper end of the rod 462 by another conductor 564. As hereinbefore stated, the rod 462 is normally grounded through the contacts 490, 492 and housing 328 of the accumulator assembly 32. The above circuit operates in substantially the same manner as the circuit described in connection with FIG. 12 in that the unloading solenoid 186 normally remains closed due to the fact that the contact 82 is not engaged with the terminal member 70 and hence the circuit is open. Assuming proper rotation of the shaft 114, the arm 56 will bias the contact 82 into engagement with the terminal 70 and thereby complete the aforesaid circuit, resulting in energization of the unloading solenoid 186. This circuit will remain closed until the shaft 114 rotates in the opposite direction to permit disengagement of the contact 82 from the terminal member 70, or until the fluid pressure within the housing 328 of the accumulator assembly 32 drops to approximately 150 p.s.i., at which time the compressed nitrogen on the right side of the piston member 530 will bias the rod 542 toward the left and interpose the same between the contacts 490 and 492. It may be noted that although the piston member 530 is disposed in the position wherein the rod 542 is disposed between the contacts 490, 492, there is still sufficient power steering fluid within the assembly 32 and the conduits 456 and 458 for proper operation of the shock absorbers 26 and 28.

To facilitate correlating all of the above described assemblies such as the leveling switch assembly 30, the fluid accumulator assembly 32 and the distribution valve assembly 34, an exemplary operational cycle of the vehicle leveling system 10 of the present invention will now be given.

Assuming the initial condition that the vehicle is completely unloaded or only lightly loaded, the body of the vehicle will be in a substantially level attitude with respect to the axle assembly 24 thereof, and the link members 122, 124 and 126 will be in their respective positions illustrated by the solid lines in FIG. 1. Accordingly, the shaft 114 and arm 56 will be in the positions illustrated in FIG. 2 so that the electrical circuits through the contact 80 and terminal 68, and through the contact 82 and terminal 70 will be open to prevent energization of the loading solenoid 184 or unloading solenoid 186. As best illustrated in FIG. 7, when the unloading solenoid 186 is not energized, the coil spring 252 resiliently engages the valve member 250 with the valve seat section 254 to prevent fluid flow from the fluid passage 240, through the cavity 246 and fluid passages 262 to the passage 260, thereby blocking fluid flow from the reservoir section 174 of the power steering unit 12 to the fluid accumulator assembly 32 through the fluid conduits 172 and 170. During the time the loading solenoid 184 is not energized, the coil spring 312 resiliently urges the armature 200 toward the left, thereby engaging the valve member 324 with the right end of the check valve housing 268 to block fluid flow through the bore 278. It will be seen that the check valve 282 is resiliently engaged with the valve seat 276 to also preclude any fluid flow through the bore 278. However, power steering fluid may flow from the fluid passage 294, through the plurality of ports 290, the central bore 288 and ports 300 in the insert member 285, into the fluid passage 296, thereby providing for normal fluid flow from the pump section 168 of the power steering unit 12 through the conduits 166 and 164 to the power steering valve mechanism 14.

At such time as the vehicle becomes loaded to any appreciable degree, the rear end of the vehicle will be lowered with respect to the axle assembly 24. As this occurs, the link members 122, 124 and 126 will be biased to the position A indicated in phantom in FIG. 1. Initial pivotal movement of the link 126 with respect to the switch housing 38 results in the casing 130 being rotated simultaneously therewith, thereby causing the piston member 148 to move toward the right in FIG. 3 against the resistance of the coil spring 150. After the link 126 and casing 130 have rotated a predetermined amount, any further rotational movement thereof due to a change in attitude of the vehicle body with respect to the axle assembly 24, will cause the shaft 114 to rotate in a counterclockwise direction in FIGS. 2 and 12. As the shaft 114 thus rotates, the switch element 52 will be biased toward the left and the head portion 58 thereof will engage the spring element 84, resulting in the contact member 80 engaging the inner portion 76 of the terminal 68. Such movement of the switch member 52 is resisted by the detent 102 and the viscous silicon fluid disposed within the compartment 40. Also, movement of the switch element 52 within the compartment 40 is resisted by the variable size orifice defined between the lower end of the switch element section 62 and the boss portion 108 formed in the lower end of the compartment 40, as hereinabove described.

Assuming that the vehicle's ignition switch 20 is turned on, as the contact 80 engages the terminal 68, the loading solenoid 184 will be energized through the electrical circuit consisting of the conductors 550, 548, 554 and 556, as hereinabove described in connection with the schematic diagram illustrated in FIG. 12. Upon energization of the solenoid 184, the armature 200 thereof will move toward the right from the position illustrated in FIG. 7 to the position indicated in FIG. 8, thereby biasing the valve member 324 away from the right end of the bore 278 to communicate the bore 288 with the interior of the check valve housing 268, whereby the check valve member 282 will be disengaged from the valve seat 276 due to the fluid pressure within the bore 288. As the armature 200 moves toward the right, the sleeve valve member 308 will move into registry with the plurality of ports 300 in the valve insert member to at least partially limit the flow of power steering fluid from the bore 288 into the fluid passage 96. When the sleeve valve 308 is disposed in the position illustrated in FIG. 8, approximately one-third of the fluid pumped to the valve assembly 34 is communicated to the valve mechanism 14 and the remaining fluid flows through the plurality of ports 322, the bore 274 in the check valve housing 268, the fluid passage 260, and the conduit 170 to the accumulator assembly 32. It will be seen from the above that upon energization of the loading solenoid 184, power steering fluid will flow from the pump section 268 of the power steering unit 12 to both the power steering valve mechanism 14 and the accumulator assembly 32 to maintain normal operation of the valve mechanism 14 and to effect predetermined expansion of the shock absorber members 26 and 28, as will hereinafter be described.

As best seen in FIGS. 10 and 11, the power steering fluid which is pumped through the conduit 170 flows into the bore 460 of the fluid fitting and terminal support member 444, and thereafter flows downwardly into the interior of the housing 328. Due to the fact that the pressure of the power steering fluid flowing into the housing 328 is somewhat greater than 140 p.s.i., the pressure of the compressed nitrogen on the right side of the piston member 530, the entire piston assembly 532 is urged toward the right end of the housing 328. It will be noted that under normal loading conditions, the pressure of the power steering fluid initially pumped to the accumulator assembly 32 is less than 425 p.s.i., the pressure of the compressed nitrogen disposed in the housing 328 interjacent the piston assembly 408 and the end header member 334, so that the pressure of the power steering fluid is not sufficient to bias the piston assembly 408 toward the left end of the housing 328. Since the fluid pressure of the power steering fluid which flows into the housing 328 is determined by the pressure of the compressed nitrogen at the opposite ends thereof, at such time as the pressure of the power steering fluid in the housing 328 reaches a predetermined level, any further fluid pumped from the power steering unit 12 will flow from the member 444 through the conduits 456 and 458 to the shock absorber members 28 and 26, respectively, causing the members 26 and 28 to longitudinally expand and thereby raise the rear end portion of the vehicle with respect to the axle assembly 24 thereof and thereby effect leveling of the vehicle body.

In the event that the vehicle is overloaded, the fluid pressure within the housing 328 will exceed 900 p.s.i. due to the relatively high pressure required to expand the shock absorber members 26 and 28. Accordingly, the piston assembly 408 will be biased toward the left end of the housing 328, thereby causing the end section 442 of the plunger 432 to be interposed between the face portions 404 and 406 of the clips 384 and 386 to break the circuit to the loading solenoid 184 and terminate the flow of power steering fluid to the assembly 32. This, of course, assures that the power steering pump will not operate to pump power steering fluid to the assembly 32 when the vehicle is overloaded. As above stated, there is some differential movement provided between the plunger member 432 and the piston member 410 so that as the assembly 408 moves toward the left end of the housing 328, the end section 442 of the plunger member 432 will not separate the clips 384 and 386 until the coil spring 436 has been compressed. Such differential movement between the plunger member 432 and piston member 410 prevents the clips 384 and 386 from being separated when there is a temporary pressure increase within the chamber 330, as might occur when the vehicle traverses road bumps or similar surface irregularities in the road which cause a momentary change in attitude in the vehicle body with respect to the axle assembly 24. Also, the differential movement provided between the members 432 and 410 prevents the clips 384 and 386 from being separated when there is a change in attitude of the vehicle body with respect to the axle assembly 24 resulting from acceleration of the vehicle. In addition, the viscous silicon fluid within the switch housing 38 is adapted to dampen any movement of the shaft 114 with respect to the links 122, 124 and 126 so that the contact 80 is continuously engaged with the terminal 68 in spite of any momentary changes in the attitude of the vehicle body.

It will be seen from the above description of the operation of the accumulator assembly 32 that this assembly is adapted to minimize to the extreme the volume of power steering fluid required to expand the shock absorber members 26 and 28 since the compressed nitrogen in the opposite ends of the housing 328 continuously force the piston assemblies 528 and 48 away from the opposite ends thereof, thus forcing the power steering fluid to the shock absorber members 26, 28. Moreover, the provision of the accumulator assembly 32 serves to minimize the spring rate of the shock absorber members 26 and 28 and hence reduce frequency of oscillation created as the vehicle traverses road bumps and the like.

At such time as the vehicle is unloaded a predetermined amount, resulting in the rear end thereof being elevated with respect to the axle assembly 24, the link members 122, 124 and 126 will be pivoted to the position B indicated in phantom in FIG. 1. As the link 126 is pivoted with respect to the switch housing 38, the casing 130 will be rotated simultaneously therewith, causing the piston member 148 to initially move toward the left in FIG. 3 until the left end of the piston member 148 contiguously engaged the flat 146 on the shaft 114. This, of course, permits the shaft 114 to rotate clockwise in FIG. 2, resulting in the switch element 52 moving out of engagement with the spring element 84 to break the circuit between the contact 80 and the terminal 68, thereby deenergizing the loading solenoid 184. As the solenoid 184 is thus deenergized, the armature 200 thereof will be biased from the position indicated in FIG. 8 to the position indicated in FIGS. 7 and 9, whereby to block the flow of power steering fluid from the pump section 168 of the power steering unit 12 to the accumulator assembly 32. As above stated, when the armature 200 is disposed in the position indicated in FIGS. 7 and 9, normal free fluid flow is provided between the pump section 168 of the power steering unit 12 and the valve mechanism 14, thereby enabling the power steering system to operate normally.

As the link member 126 is initially pivoted to the position B in FIG. 1, the casing 130 will be rotated with respect to the switch housing 38 a sufficient amount to cause the shaft 114 to rotate counterclockwise until the switch element 52 engages the contact 82 with the terminal 70, thereby completing the circuit energizing the unloading solenoid 186, as illustrated in FIG. 13. Energization of the solenoid 186 causes the armature 202 thereof to move toward the left from the position indicated in FIGS. 7 and 8 to the position indicated in FIG. 9, thereby biasing the valve member 250 out of engagement with the valve seat section 244 to permit free fluid flow from the fluid passage 260 through the passage 262, cavity 246, and passage 242 to the passage 240. Accordingly, fluid within the accumulator housing 328 may flow through the conduit 170, valve assembly 34 and conduit 172 to the reservoir section 174 of the power steering unit 12. The check valve 282 is automatically engaged with the valve seat 276 by the spring 284, thereby preventing any fluid flow from the conduit 170 into the pump section 168 of the power steering unit 12 or the valve mechanism 14 of the power steering system. As the power steering fluid is unloaded from the assembly 32 and communicated back to the power steering unit 12, the fluid pressure within the chamber 328 will decrease, thereby reducing the fluid pressure in the conduits 456 and 458 to permit the shock absorber members 26 and 28 to contract a predetermined amount under the influence of the weight of the vehicle, whereby the body of the vehicle will assume its normal level attitude.

It will be seen from the above that the loading and unloading solenoids 184 and 186, respectively, will be selectively energized as the attitude of the vehicle body is raised or lowered with respect to the axle assembly 24, thereby providing for fluid flow between the power steering unit 12 and the accumulator assembly 32, and hence to or from the shock absorber members 26 and 28. When the vehicle is in a substantially unloaded or lightly loaded condition, the link members 122, 124 and 126 will be disposed in the positions indicated in solid lines in FIG. 1 and hence the switch element 52 will be disposed in the neutral or central position illustrated in FIG. 2, whereby the circuits to each of the solenoids 184 and 186 is open.

It may be noted that when the rear end of the vehicle is jacked up for any reason, the shock absorbers 26, 28 will expand under the influence of the weight of the axle assembly 24, thereby considerably reducing the pressure within the members 26, 28. As this occurs, the fluid pressure within the central portion of the accumulator housing 328 decreases accordingly, resulting in the piston assembly 528 moving toward the center of the housing 328 and engaging and separating the members 490 and 492, thereby deenergizing the solenoid 186 and assuring that the power steering fluid within the system 10 will not all be communicated back to the power steering system.

Although particular reference has been made herein to the leveling system 10 of the present invention being operatively associated with the power steering system and shock absorbers of an automotive vehicle, it will be noted that the present invention is not intended to be limited to such a combination since the leveling system 10 is adapted to operate effectively with various sources of pressurized fluid other than a power steering system, such as an auxiliary pump for pumping transmission fluid to and from the accumulator assembly. Furthermore, it will be noted that the raising and lowering of the vehicle body with respect to the axle assembly thereof may be accomplished by any one of a number of well known fluid pressure expandable devices other than hydraulic shock absorbers, for example, conventional hydraulically actuated piston and cylinder assemblies or the like. In addition, it will be appreciated that the leveling system 10 of the present invention may be provided with manually actuable switch means adapted to be located on the dashboard or instrument panel of the vehicle and function to either supplement or replace the switch assembly 30. For example, a suitable 3-position switch could be used in lieu of or to supplement the assembly 30 and adapted to be manually actuated to a first or "off" position wherein both of the solenoids 184 and 186 are deenergized, to a second position wherein the loading solenoid 184 is energized to effect expansion of the shock absorbers 26, 28 and hence elevation of the rear end of the vehicle body, or to a third position wherein the unloading solenoid 186 is energized to effect contraction of the members 26, 28 and hence lowering of the rear end of the vehicle body. As another possible alternative, it is contemplated that the distribution valve assembly 34 may be modified slightly whereby the valve members 248, 308 and 324 are movable within the valve housing 178 in response to actuation of a mechanical linkage, for example, a flexible cable or the like, extending between the valve assembly 34 and a suitable actuating lever mounted on the instrument panel of the vehicle.

While it will be apparent that the exemplary embodiment herein illustrated is well calculated to fulfill the objects above stated, it will be appreciated that the leveling system 10 of the present invention is susceptible to modification, variation and change without department from the proper scope or fair meaning of the subjoined claims.

I claim:

1. In combination in a leveling system for a vehicle comprising sprung and unsprung portions,
a fluid operated leveling device for selectively varying the attitude between said vehicle portions,
a source of actuating fluid,
pump means for pumping fluid from said source thereof to said leveling device,
a fluid accumulator including means defining first and second variable volume chambers at least in part defining therebetween a third chamber communicable with said fluid source and said leveling device, and
means for controlling operation of said pump means in response to volume changes in at least one of said chambers.

2. The combination as set forth in claim 1 which includes means for permitting the volume of one of said variable volume chambers to decrease in response to an increase in fluid pressure in said third chamber.

3. The combination as set forth in claim 1 which includes movable partition means at least in part defining one of said chambers.

4. The combination as set forth in claim 2 wherein said last mentioned means comprises a compressible fluid.

5. The combination as set forth in claim 4 wherein said compressible fluid comprises a pressurized gas.

6. The combination as set forth in claim 1 which includes first and second compressible fluids disposed in said first and second variable volume chambers, respectively.

7. The combination as set forth in claim 6 wherein said first and second fluids are at different pressures.

8. The combination as set forth in claim 1 wherein said fluid accumulator comprises housing means and first and second movable partition means disposed interiorly of said housing and defining said chambers therewith.

9. The combination as set forth in claim 8 wherein said housing is of a generally cylindrical configuration and which includes first and second partition means movable interiorly of said housing and defining therewith said first, second and third chambers, with said third chamber being located between said first and second chambers.

10. The combination as set forth in claim 9 wherein said partition means includes at least one piston member longitudinally slidable within said cylindrical housing.

11. The combination as set forth in claim 8 which includes means responsive to movement of one of said movable partition means for controlling an electrical circuit to said pump means.

12. The combination as set forth in claim 7 which includes means for deenergizing said pump means when the pressure in said third chamber exceeds the pressure in one of said variable volume chambers.

13. The combination as set forth in claim 7 which includes means for deenergizing said pump means when the pressure in one of said variable volume chambers exceeds the pressure in said third chamber.

14. The combination as set forth in claim 10 which includes a pair of longitudinally slidable pistons in said housing, one of said pistons defining with said housing one of said variable chambers and the other of said pistons defining with said housing the other of said variable volume chambers, with both of said pistons defining with said housing said third chamber, wherein said first and second chambers are filled with pressurized fluid at different pressures, and which includes first and second pump control means operable in response to movement of said pistons, whereby when the pressure in said third chamber exceeds the pressure in said first chamber, said pump means will be deactuated, and when the pressure in said second chamber exceeds the pressure in said third chamber said pump means will be deactuated.

15. In combination in a vehicle leveling system including a fluid operated leveling device, a source of actuating fluid and means communicating fluid between the source thereof and the leveling device,
 a fluid accumulator including means defining first and second variable volume chambers at least in part defining therebetween a third chamber communicable with said fluid source and said leveling device, and
 means for permitting the volume of one of said variable volume chambers to decrease in response to an increase in fluid pressure in said third chamber.

16. The combination as set forth in claim 15 which includes partition means at least in part defining one of said chambers.

17. The combination as set forth in claim 15 wherein said last mentioned means comprises a compressible fluid.

18. The combination as set forth in claim 17 wherein said compressible fluid comprises a pressurized gas.

19. The combination as set forth in claim 15 which includes first and second compressible fluids disposed in said first and second variable volume chambers.

20. The combination as set forth in claim 19 wherein said first and second fluids are at different pressures.

21. The combination as set forth in claim 15 wherein said fluid accumulator comprises housing means and first and second movable partition means disposed interiorly of said housing and defining said chambers therewith.

22. The combination as set forth in claim 21 wherein said housing is of a generally cylindrical configuration and which includes first and second partition means movable interiorly of said housing and defining therewith said first, second and third chambers, with said third chamber being located between said first and second chambers.

23. The combination as set forth in claim 22 wherein said partition means includes at least one piston member longitudinally slidable within said housing.

* * * * *